United States Patent
Simha et al.

(10) Patent No.: US 10,606,807 B1
(45) Date of Patent: Mar. 31, 2020

(54) DISTRIBUTED CLIENT SIDE DEDUPLICATION INDEX CACHE

(71) Applicant: EMC IP Holding Company LLC, Hopkinton, MA (US)

(72) Inventors: Dilip N. Simha, San Jose, CA (US); Thomas Sandholm, Mountain View, CA (US); Julio Lopez, Mountain View, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 97 days.

(21) Appl. No.: 15/581,062

(22) Filed: Apr. 28, 2017

(51) Int. Cl.
| | | |
|---|---|---|
| *G06F 16/00* | (2019.01) | |
| *G06F 16/174* | (2019.01) | |
| *G06F 16/13* | (2019.01) | |
| *G06F 16/14* | (2019.01) | |
| *G06F 16/172* | (2019.01) | |
| *G06F 16/18* | (2019.01) | |

(52) U.S. Cl.
CPC .......... *G06F 16/1752* (2019.01); *G06F 16/13* (2019.01); *G06F 16/152* (2019.01); *G06F 16/172* (2019.01); *G06F 16/1873* (2019.01)

(58) Field of Classification Search
CPC ......... G06F 17/30156; G06F 17/30153; G06F 17/30162; G06F 17/30864; G06F 11/1453; G06F 17/30132; G06F 12/0871; G06F 17/30212; G06F 17/30221; G06F 2201/00; G06F 2201/81; G06F 15/8084; G06F 17/30135; G06F 17/30159; G06F 17/30203; G06F 17/30303; G06F 17/30336; G06F 3/0641
See application file for complete search history.

(56) References Cited

U.S. PATENT DOCUMENTS

| | | | | |
|---|---|---|---|---|
| 7,814,149 | B1 * | 10/2010 | Stringham | ........ G06F 17/30156 707/758 |
| 8,396,839 | B1 * | 3/2013 | Huang | ............ G06F 17/30156 707/664 |
| 9,298,723 | B1 * | 3/2016 | Vincent | ............ G06F 17/30156 |
| 2008/0270436 | A1 * | 10/2008 | Fineberg | ............... G06F 16/137 |
| 2010/0098092 | A1 * | 4/2010 | Luo | ..................... H04L 12/4633 370/401 |
| 2012/0150818 | A1 * | 6/2012 | Vijayan Retnamma | ..................... G06F 11/1453 707/679 |
| 2014/0101113 | A1 * | 4/2014 | Zhang | ................. G06F 11/1453 707/692 |

* cited by examiner

*Primary Examiner* — Yicun Wu
(74) *Attorney, Agent, or Firm* — Workman Nydegger (57) ABSTRACT

Systems and methods for deduplicating data are provided. An index used in deduplicating data is distributed to clients. The clients can use the distributed index to provide hints as to whether the data is deduplicated at the server. The server may be associated with a main index used to confirm whether the data is deduplicated based on the hints.

20 Claims, 5 Drawing Sheets

DISTRIBUTED CLIENT SIDE DEDUPLICATION INDEX CACHE

FIELD OF THE INVENTION

Embodiments of the present invention relate to systems and methods for storing data and/or to deduplicating data. More particularly, embodiments of the invention relate to systems and methods for deduplicating data using a client side deduplication index.

BACKGROUND

Many entities today store large amounts of data in various forms, including backup data. While protecting data is a wise approach, storage and cost are not limitless. Large amounts of data can constrain systems and detrimentally impact performance. The sheer volume of data makes it difficult to maintain system speeds associated with less data.

To solve some of these problems, some computing systems, including backup systems, deduplicate the data. While this can conserve or reduce the amount of storage required to store the data, it also introduces complexities related to the deduplication process. In order to deduplicate the data, it is necessary to identify the duplicate data. This can require a significant amount of storage, processing and overhead. Further, it is necessary to store information that will allow the system to identify data that is a duplicate of existing data.

Typically, the information needed to performed deduplication is stored in fast memory such as RAM or flash memory. However, this memory is often smaller and more expensive than conventional disk storage. As a result, the entire database or index used to perform deduplication cannot be stored in the fast memory. Alternatively, storing the entire index in fast memory can prevent the fast memory from being used for other purposes. Either way, performance is affected. When less than the entire index is stored in fast memory, additional problems arise. One problem is that in order to determine whether certain data is a duplicate, it becomes necessary to access the index stored in slower memory. This may impact the performance of the deduplication process when a disk access is required. Systems and methods are needed to perform and improve the deduplication process.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for deduplicating data. Embodiments of the invention further relate to systems and methods for distributing an index used in deduplicating data. In some embodiments, an index used to deduplicate data stored or maintained by a server (or a plurality of servers) is at least partially distributed to clients that communicate with the servers. This allows the clients to de-duplicate data or to provide hints to the server as to whether data is deduplicated. Advantageously, this reduces the processing burden of the server with respect to deduplicating the data received from the client or from multiple clients.

In one example, the index may be implemented as a database and may include a fast index (a fast database) and a main index (a main database). The fast index is typically smaller than the main index and can be accessed more quickly. In one example, the fast index is distributed to clients. Thus, the clients may each store a portion of the fast index. The portions of the fast index distributed to the clients are not removed from the portion maintained at the server.

The fast index determine whether data or a chunk of data is deduplicated. Alternatively, the fast index may provide a hint as to whether the chunk is deduplicated. Data is deduplicated when, for example, the data is represented or found in the fast index and the main index. When the fast index provides a hint as to whether a chunk has already been deduplicated, the main index may be used to confirm whether the chunk is deduplicated or whether the chunk is unique and should be added to data maintained by the server.

As previously stated, the fast index or portions thereof may be distributed to clients. Because the clients may store a portion of the fast index, the clients can provide hints to the server as to whether the chunk is deduplicated. This may relieve the server of performing a fast index lookup and may allow the main index to confirm the hint more quickly. Consequently, the performance of the deduplication system is improved.

Figure 1:
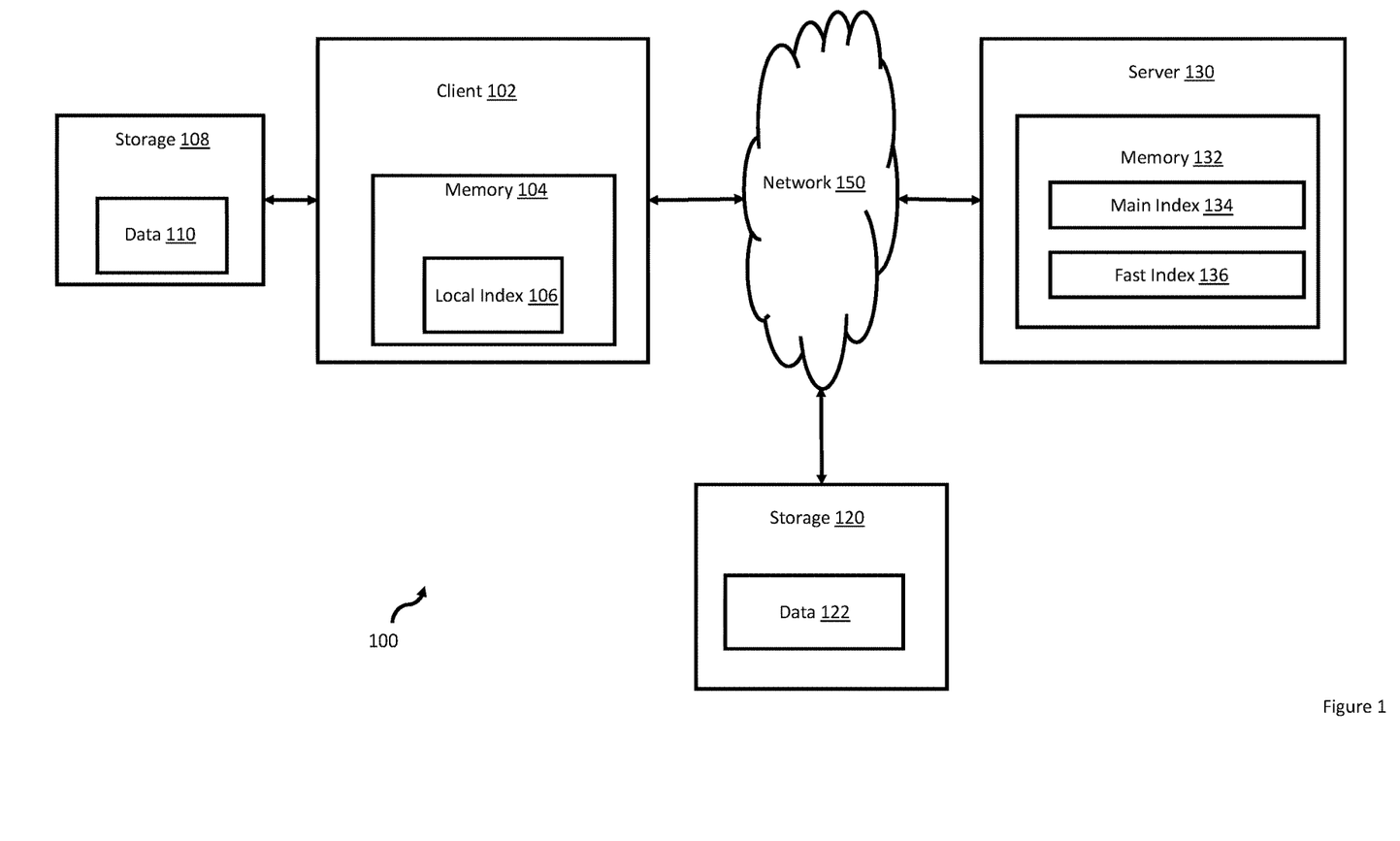
FIG. 1 illustrates an example of a computing system in which embodiments of a distributed index for deduplicating data may be implemented.

FIG. 1 illustrates an example of a computing system in which data can be deduplicated using a distributed index, also referred to as a client side or local index. FIG. 1 illustrates a server 130 that may communicate with a client 102 and storage 120 over a network 150. FIG. 1 illustrates a client 102 that is associated with a storage 108 that stores data 110. The client 102 may also include a memory 104 that is used to store a local index 106.

FIG. 1 also illustrates a server 130 that is configured to maintain and store the data 110 of the client. The data 110 may be stored as the data 122 in a storage 120. The storage 120 may be network based storage, third party storage, direct attached storage, integrated with the server 130 or the like or any combination thereof. Further, the data 122 may correspond to multiple clients. Also, the data 122 may be deduplicated by the server 130. In one example, the data 122 can be accessed by the server 130 and/or the client 102. The data 122 may be backup data, production data, or the like.

The server may include or has access to a memory 132 that stores a fast index 136 and a main index 134. The local index 106 may be a copy of at least a portion of the fast index 136 maintained by the server. Further, the local index 106 may be constructed by the client 102 over time. As chunks are uploaded to the server 130, the local index 106 may be filled with entries corresponding to the uploaded chunks. Some of the information needed for the local index 106 may be provided by the server 130 for example.

Figure 2:
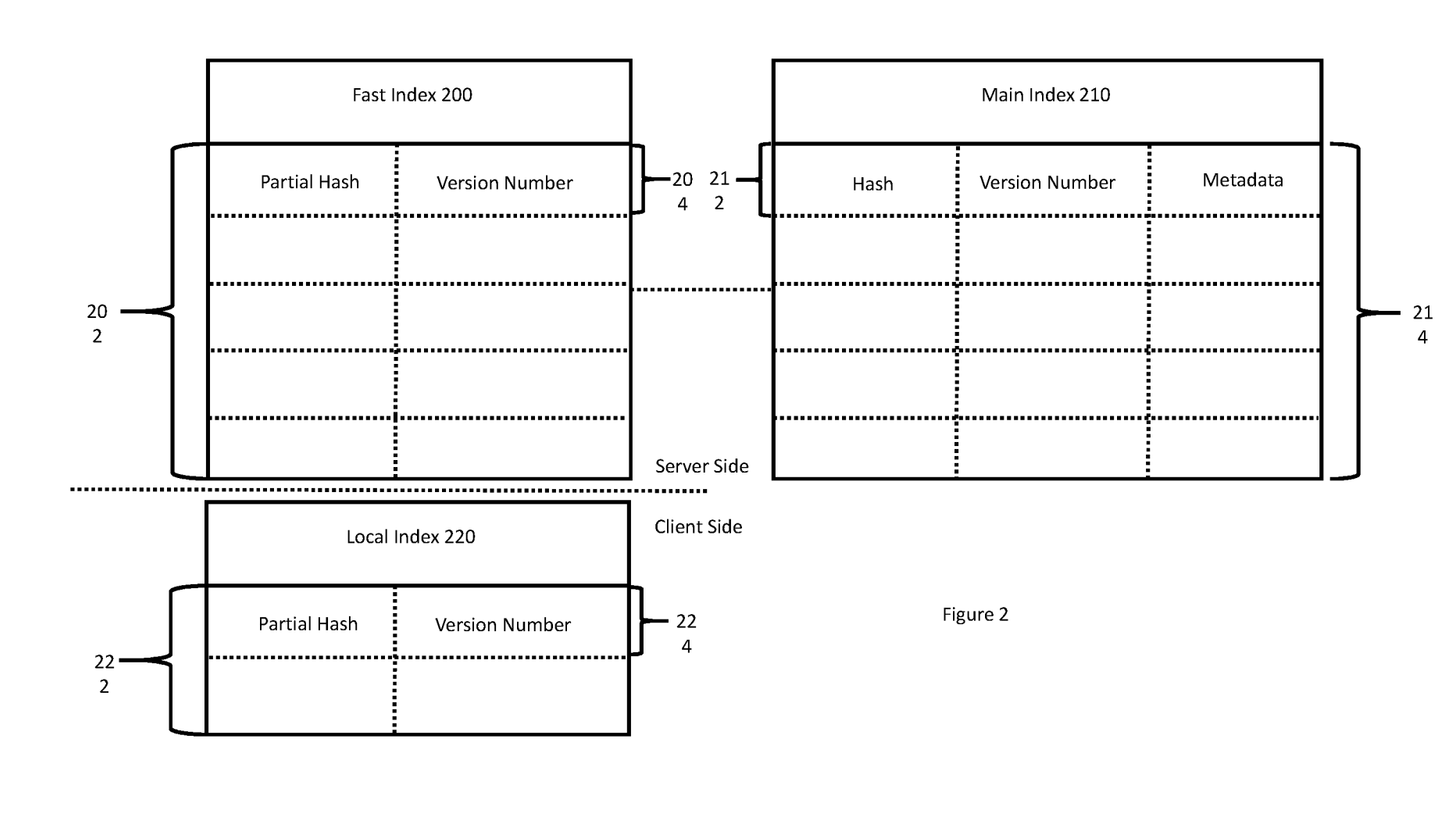
FIG. 2 illustrates an example of an index, including a fast index and a main index, that may be distributed to a client.

FIG. 2 illustrates a fast index 200, which is an example of the fast index 136, a main index 210, which is an example of the main index 134, and a local index 220, which is an example of the local index 106. Each entry in the fast index 200 associates a hash or a partial hash of a chunk of data with a version number. In this example, the entry 204 includes a partial hash (by way of example and not limitation, the first four bytes of a 20 byte hash of a chunk) and a version number. The version number is a number that is unique to the chunk associated with the partial hash and is assigned by the server 130. No two chunks have the same version number. When a partial hash of a chunk matches more than one entry in the fast index 200, the main index 210 can be used to determine the correct chunk.

The local index 220 is, in one embodiment, a smaller version of the fast index 200 (e.g., contains information for less than all of the chunks identified in the fast index 200 and the main index 210). The local index 220 also includes a partial hash and a version number. However, the local index 220 has fewer entries than the fast index 200. The version number in local index 220 may be obtained from the server 130 or from the main index 210.

The main index 210 also includes a plurality of entries 212. Each entry, such as entry 212, may include a full hash of a data chunk, the version number, and other metadata associated with the chunk (e.g., storage location, etc.). By way of example only, the metadata may include one or more of a compressed chunk size, an uncompressed chunk size. The uncompressed chunk size is needed, for example, when files are dynamically broken or divided into variable sized chunks. The metadata may also include, by way of example only, one or more of a reference count of how many files link to a chunk, an encryption key, a compression state, a chunk state, a data server location. The chunk state may identify, for example, different stages of when the chunk is written to the main data server (e.g., verified written, unverified written garbage collect pending, etc.).

When the server 130 receives a chunk, the chunk is hashed and a portion of the resulting hash is used to access the fast index 200. Alternatively, the client 102 may hash the chunk and provide the chunk and/or the hash to the server 130. In one example, a partial hash may match multiple entries in the fast index 200. When this occurs, the main index 210 may be accessed to identify the correct entry for the chunk. For example, the main index 210 stores the full hash, which allows the correct chunk to be identified.

More specifically, when a chunk of data and/or or a hash of the chunk or a partial hash of the chunk is received at the server 130, the server 130 may access the fast index 200 based on a portion of the hash of the chunk. For example, the server 130 may compare the first four bytes of the hash with the entries 202 in the fast index 200 to identify matching entries (there may be zero, one, or more than one match).

The version numbers associated with the matching entries in the fast index 200 and/or the full hash of the chunk can then be used to determine which entry in the main index 210 is the correct entry. A comparison with the full hash stored in the main index 210 may also be performed. The main index 210 can be accessed using the version number, which is unique and a full hash can be retrieved based on the version number. Thus, the fast index on the server of the local index on the client can be used to convert the hash to a version number and the version number can be used to fetch the full hash from the main index. The full hashes can be compared to determine a match or not. This allows the correct entry to be identified. Then, the server 130 can make further changes to reflect that the data of the client is already stored in the data 122 of the storage 120.

When only a single match is found in the fast index 200, the server 130 may determine or confirm that the chunk is deduplicated after accessing the main index 210 using the version number identified from the fast index 200. In this case when the chunk is deduplicated, other processing may be performed such that the deduplicated chunk is still associated with the client 102 and/or with the file of the client 102. In other words, even though the specific chunk provided by the client 102 is not stored by the server 130 (because it is already present at or maintained by the server), it is necessary to maintain sufficient information or metadata such that the client can retrieve the chunk (and/or the file of which the chunk may be a part) if necessary When backing up the data 110 to the server 130 or when sending data to the server 130, the local index 106 may be used to determine whether the data or chunk already exists in the data 122 or to provide a hint that the data already exists in the data 122.

For example, when uploading a file or data to the server 130, the file may be broken into chunks. The chunks may have a predetermined size. These chunks may then be sent to the server 130 for storage. The server 130 deduplicates the chunks such that, in one embodiment, a single version of the chunk is stored by the server 130.

When data is determined to be unique by the server 130, the server 130 may enter the data into storage. Alternatively, the client may enter the data into the storage and the server 130 is responsible for ensuring that the data can be retrieved by the client by recording appropriate metadata.

With reference back to FIG. 1, consider the following example. The client 102 prepares and uploads hashes (a1-hash to a5-hash) of the chunks a1, a2, a3, a4, a5 (a1-a5). Alternatively, the client may upload the chunks a1-a5 and the server may generate the hashes. However it is preferable to only send the full hashes of the chunks initially. In this example, the chunks are sent or transferred to the server 130 after the hashes are processed as discussed herein. In one embodiment, the server may provide the client with a URL after determining which chunks need to be uploaded and the chunks can be transferred to the location associated with the URL.

Next, the server 130 accesses the fast index 136 using a partial hash. For example, the fast index 136 may be accessed using a portion of a1-hash to determine if the chunk a1 is represented in the fast index 136. If no entry is found, then the chunk a1 is unique. The chunk is then assigned a version number and stored with the other data maintained by the server 130. If only a single match is found in the fast index 136, then the chunk a1 may be deduplicated and not entered into storage because the chunk is already present. The determination of whether the chunk a1 is deduplicated is confirmed by accessing the main index based on the version number. The full hash stored in the main index can then be compared with the full hash of the chunk a1 to confirm the match or to confirm that the chunk already exists in the storage of the server.

If multiple matches are found in the fast index 136 (and even when a single match is found in one embodiment), the main index 136 may be accessed to determine the correct match. If a match is not found in the main index 136, then the chunk is unique, assigned a version number, and stored by the server 130. If a match is found, then the chunk is deduplicated and is not entered into storage by the server 130.

More generally, if these chunks (a1-a5) are present in the fast index 136, the fast index 136 returns the corresponding version numbers of the chunks a1-a5. If the chunks a1-a5 are not present in the fast index 136, this suggests that the chunks are unique and are not presently stored in the data 122.

The server 130 may access the main index 134 using the version numbers returned from the fast index 136 to confirm that the chunks are deduplicated. If there is no match in the main database or there were no matches to begin with, the main index 130 determines that the incoming chunks a1-a5 are unique and stores the appropriate information in both the main index 130 and in the fast index 134. If the chunks are unique, a version number is generated and associated with each new chunk. The chunks are also added to the main index 130 and the fast index 136.

After the version numbers for the chunks a1-a5 are generated by the server 130, the version numbers are provided to the client 102. The client 102 then stores the hashes (or partial hashes) and the version numbers of the new chunks in the local index 106. In this manner, the server 130 begins to distribute at least a portion of the fast index to the client 102 and the local index 106 is a distributed portion of the fast index 136 in one embodiment. Alternatively, the local index 106 can be seeded with entries from the fast index 136.

In one example, all chunks maintained by the server 130 are included or represented in the main index 134 and in the fast index 136. This allows the client 102 to relieve the processing burdens of the server 130 without compromising the operation of the server 130 should the client 102 fail.

In this manner, the fast index 136 is partially distributed to the client 102. The local index 106 can be altered over time. Over time, the entries in the local index 106 can be managed to better suit the chunks uploaded by the client 102. For example, entries in the local index 106 can be evicted over time based, for example, on age. A size of the local index 106 may be limited if desired or allowed to grow. As previously stated, the local index 106 may map, respectively, a hash of the chunks or a partial hash of the chunks to the version numbers of the chunks.

Next, the client 102 may upload chunks b1, b2, b3, b4 and b5 (b1-b5). Using the local index 106, the client 102 can determine that chunks b1 and b2 may be duplicates of chunks a1 and a2. This can be done by hashing the chunks b1 and b2 and accessing the local index 106 to determine whether the chunks are already deduplicated by the server 130. In other words, when a match is found in the local index 106 with the hashes or partial hashes of the chunks b1 and b2, this indicates or hints that the chunks b1 and b2 may already be stored and maintained by the server 130. As previously stated, this hint provided by the client that the chunks may be stored by the server 130 is typically confirmed using the main index as previously described.

Once the client 102 determines that chunks b1 and b2 may be duplicates, the client sends b1-b5 and hints b1=a1 and b2=a2 to the server 130. The server 130 skips the lookup of b1 and b2 in the fast index. The chunks b3-b5 are handled like the chunks a3-a5 previously described. Plus, the server may look up a1 and a2 to confirm that they are duplicates of b1 and b2 respectively using the main index 134. If they are not duplicates, the server 130 may perform a lookup in the fast index 136 for b1 and b2 (using the partial hash) to see if there are any matches. If matches are found or not found, b1 and b2 are then handled like chunks a1 and a2 were handled.

Figure 3:
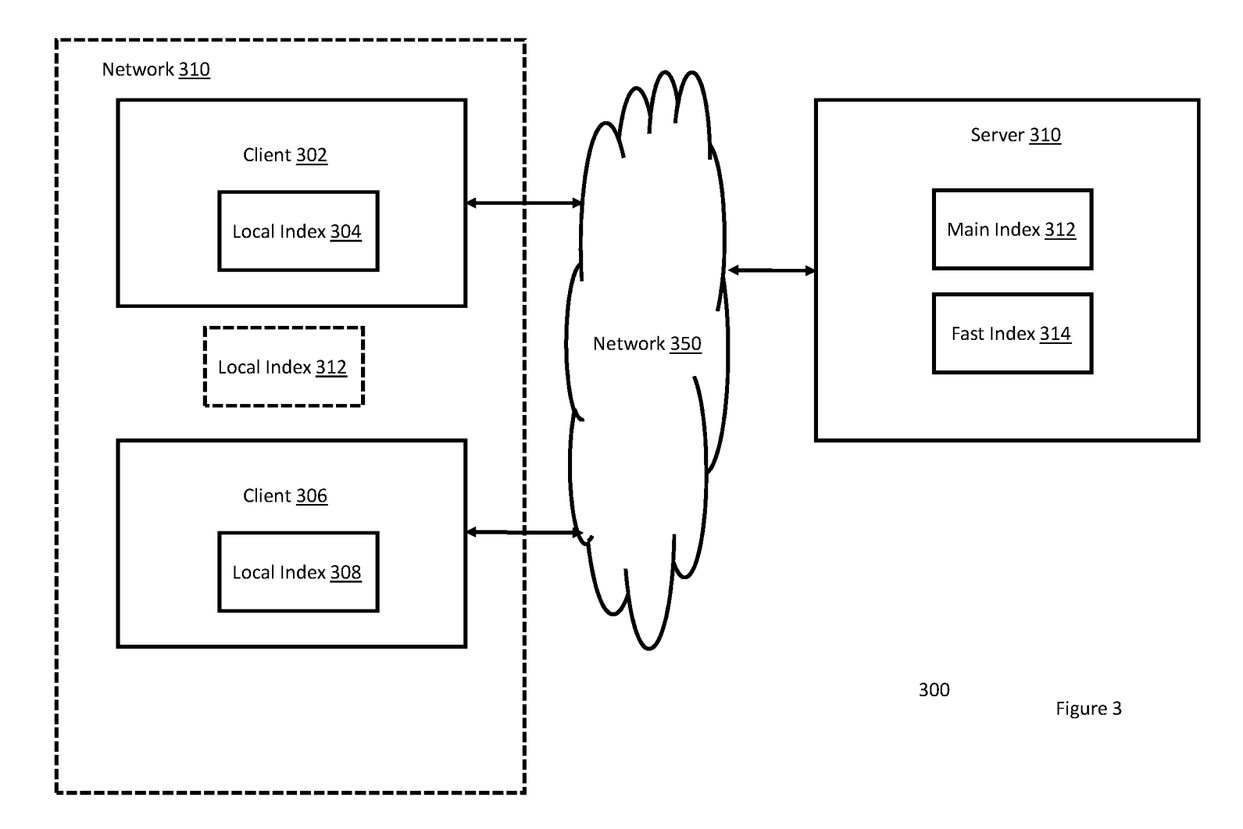
FIG. 3 illustrates an example of an index that is distributed to multiple clients.

FIG. 3 illustrates an example of a computing system where deduplication is performed and where the fast index is distributed to multiple clients. FIG. 3 illustrates a server 310 that communicates with clients such as the client 302 and the client 306 over a network 350. In FIG. 3, the clients 302 and 306 are examples of the client 102. Further, the clients 302 and 306 may, in one embodiment, be associated with the same entity and may be part of the same local area network. The server 310, which is an example of the server 130, includes or maintains a main index 312 and a fast index 314, which are examples of, respectively, the main index 134 and the fast index 136.

In this example, the fast index 314 is distributed to multiple clients. The client 302 is associated with a local index 304 and the client 306 is associated with a local index 308. The local index 304 and the local index 308 are populated and may each be specific to, respectively, the clients 302 and 306.

Alternatively, the local indexes 304 and 308 can be used cooperatively. For example, the client 302 may query the local index 304 and the local index 306 prior to uploading chunks to the server 310. For example, client 302 may upload chunks a1-a5 as previously described. Thus, the local index 304 contains hashes or partial hashes of the chunks a1-a5 and their version numbers.

Then, the other client 306 may upload chunks b1-b5 where b1=a1 and b2=a2. If the client used only the local index 308, the client 308 would not provide any hints to the server 310 that the chunks b1 and b2 may already exist at the server 310 and may be deduplicated. In this example, the client 306 may also query the local index 304 and discover that the chunks b1 and b2 may be duplicates of the chunks a1-a2. As a result, the client 306 can provide hints to the server 310 that the chunks b1 and b2 are duplicates even though the hints are stored in the local index 308.

In another example, the network 310, which includes the clients 302 and 306, may maintain a local index 312 that is not client specific. The local index 312 may be accessed and updated by multiple clients. In another embodiment, the fast index 314 may be distributed to the local index 304, the local index 308, and the local index 312.

The local indexes of the clients and/or the network 310 can be managed such that they store different data, the same data, or overlapping data. When they contain different data, more of the fast index 314 can be distributed to the clients and the processing burden of the server 310 can be reduced.

Figure 4:
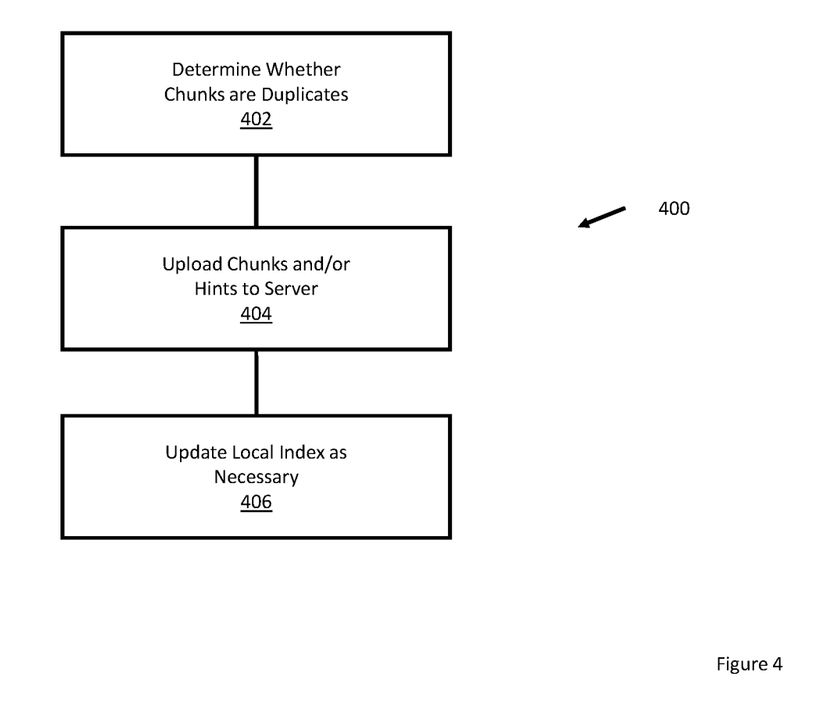
FIG. 4 is an example of a method for deduplicating data using a distributed index in a computing system.

FIG. 4 is an example of a method for distributing an index used for deduplicating data in a computing environment. The method may begin in different manners including when data to be uploaded is identified. The data is divided into chunks and the client determines 402 whether the chunks are duplicates or a possibly duplicates. A client can determine whether a chunk is a duplicate by comparing a hash or a partial hash with entries in a local index. If a match is found for one of the chunks, this suggests that the chunk may already be stored at the server and is thus deduplicated.

After determining whether the chunks may be duplicates, the chunks and hits are uploaded 404 to the server. A hint is an indication to the server that the corresponding chunk likely exists and is already deduplicated. The server then processes the chunks, as illustrated in FIG. 5.

If any of the chunks were unique or new, then the client updates 406 the local index as necessary using information provided by the server. The information received from the client may include the version numbers of any chunks that were new or unique. This information is stored in the local index and used to determine hints in future uploads.

Figure 5:
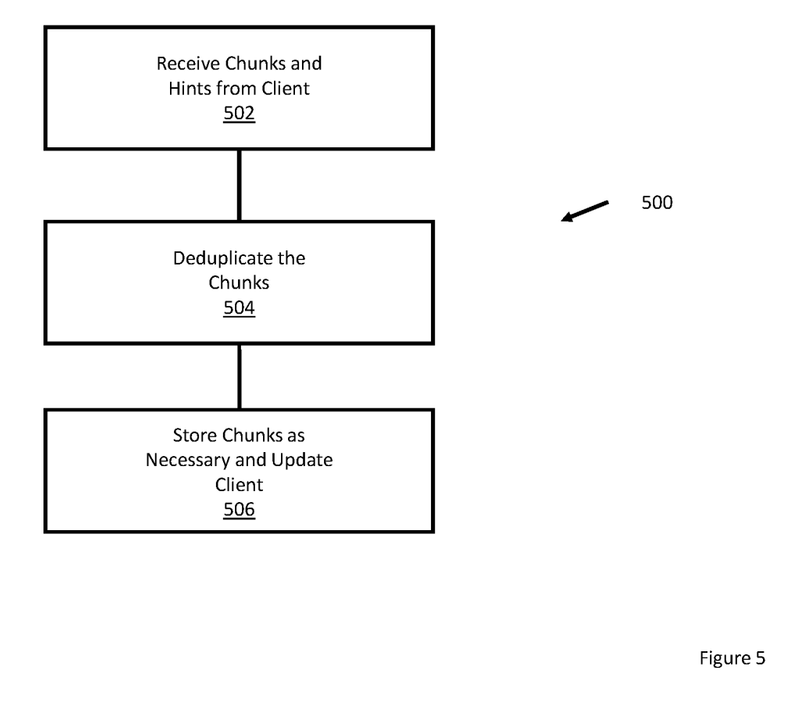
FIG. 5 is an example of a method for deduplicating data using a distributed index in a computing system.

FIG. 5 illustrates an example of a method 500 for deduplicating data using a distributed index. In FIG. 5, the server may receive 502 chunks and hints from a client. The server then deduplicates 504 the chunks using the hints. This process may differ for chunks that are associated with hints and chunks that are not associated with hints.

For chunks that are not associated with hints, the server checks the fast index for each chunk. The fast index returns the version numbers of the chunks. If the chunks are not present in the fast index, they are likely unique. Version numbers returned by the fast index are another example of hints. The server then performs a lookup in the main index for any chunk versions supplied by the fast index to confirm deduplication. If the match fails or there were no hits, the chunk is identified as unique.

For chunks that are associated with hints, the server confirms that they are duplicates using the main index. If they are present, the duplicates are confirmed. If they are not present, the fast index is used to see if there are any other matches for the chunks. Any version numbers returned from the fast index are then confirmed using the main index.

After deduplicating 504 the chunks in this manner, the chunks are stored 506 as necessary and the client is updated. Unique or new chunks are added to the store and the appropriate information (e.g., hash, partial hash, version number, etc.) is inserted into the main index and the fast index. Version numbers are also generated for the new or unique chunks. Further, for unique or new chunks, the version number is returned to the client and inserted into the local index.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for deduplicating data, the method comprising:
    determining whether one or more chunks are represented in a local index of a client, wherein the local index is a distributed portion of a fast index maintained by a server, wherein the local index associates partial identifiers with version numbers;
    determining partial identifier for each of the one or more chunks, wherein the local index allows a version number to be determined from the partial identifier;
    uploading a hint for each of the one or more chunks that is represented in the local index to a server that maintains a fast index and a main index, wherein the hint includes the version number from the local index and wherein the server determines whether the one or more chunks associated with each of the hints are already stored by the server based on the version number, wherein the version number is unique for each of the one or more chunks represented in the local index and allows the server to determine whether the one or more chunks associated with the hints are stored by the server from the main index without accessing the fast index for the one or more chunks associated with the hints; and updating the local index for each of the one or more chunks that is not a duplicate of a chunk already stored at the server.

2. The method of claim 1, further comprising dividing a file into the one or more chunks.

3. The method of claim 1, wherein determining whether the one or more chunks are represented in a local index of a client includes hashing each of the one or more chunks to generate the identifier, wherein the identifier includes a hash or a partial hash.

4. The method of claim 3, further comprising accessing the local index based on the hashes the partial hashes.

5. The method of claim 4, further comprising returning at least the version number of the chunks that are represented in the local index.

6. The method of claim 5, wherein the hint for each chunk represented in the local index includes the chunk and a version number of a chunk that may be a duplicate of the chunk.

7. The method of claim 1, further comprising receiving version numbers for each of the one or more chunks that is unique and not previously stored by the server and updating the local index with the version numbers.

8. The method of claim 1, wherein the local index comprises a portion of the fast index maintained at the server.

9. The method of claim 1, further comprising storing the local index in a fast memory.

10. A method for deduplicating data using a distributed index, the method comprising:

receiving hints that are associated with a-specific chunks identified by a client at a server, each of the hints including a version number;

receiving identifiers for chunks that are not associated with the hints;

checking a fast index maintained by the server for the chunks identified by the client that are not associated with the hints to identify version numbers of the chunks, wherein the fast index associates partial identifiers to version numbers such that the fast index is checked for the chunks based on the partial identifiers of the chunks that are not associated with the hints;

checking a main index based on the version number identified from the fast index and received from the client to confirm deduplication of the chunks that are not associated with the hints, wherein the chunks that are not associated with the hints are uploaded when not present in the fast index or not present in the main index; and confirming deduplication for the specific chunk using the main index without accessing the fast index for the chunks associated with the hints using the version numbers received from the client for the specific chunks.

11. The method of claim 10, further comprising receiving the chunks to be added to the server and assigning a version number to all of the chunks that are not confirmed as deduplicated in the main index.

12. The method of claim 11, further comprising adding all of the chunks that are not confirmed as deduplicated to the main index and to the fast index.

13. The method of claim 12, further comprising assigning a version number to each of the chunks that are not confirmed as deduplicated and entering the version number and hash into the main index and entering a partial hash and the version number into the fast index.

14. The method of claim 11, further comprising providing the version numbers of all of the chunks that are not confirmed to a client that submitted the chunks, wherein the client maintains a local index that includes a portion of the fast index.

15. The method of claim 14, further comprising seeding the local index of the client.

16. The method of claim 11, wherein chunks not found in the main index are new chunks that are added to storage, wherein chunks that are represented in the main index are deduplicated and are not added to the storage.

17. The method of claim 10, further comprising, when multiple matches are present in the fast index, determining a correct match from the main index based on a whole hash and/or the version number.

18. The method of claim 10, further comprising distributing the fast index to a plurality of clients including the client.

19. The method of claim 18, wherein the plurality of clients are each associated with a local index and wherein the hints provided from one client are determined from the local indexes of more than one of the plurality of clients.

20. The method of claim 10, further comprising generating a hash for each of the chunks by the server or by the client.

* * * * *